April 25, 1933.　　　　T. P. HALL　　　　1,906,005
AIRPLANE
Filed Aug. 13, 1931　　　3 Sheets-Sheet 1
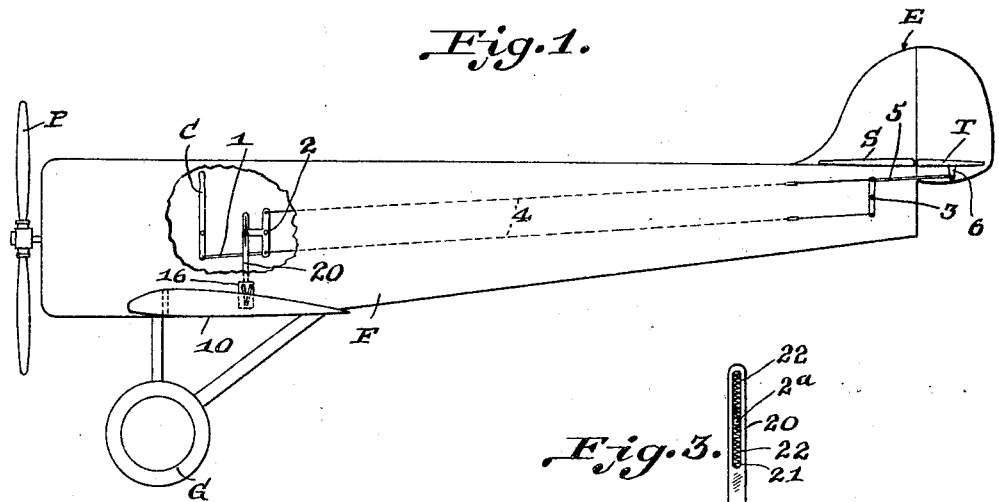
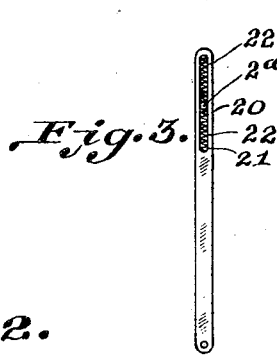
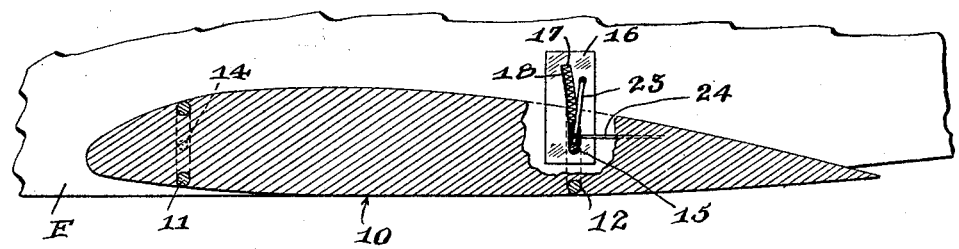
Inventor
Theodore P. Hall
By Albert E. Jech
Attorney April 25, 1933.       T. P. HALL        1,906,005
AIRPLANE
Filed Aug. 13, 1931        3 Sheets-Sheet 2

Theodore P. Hall, Inventor

By [signature]
Attorney

April 25, 1933.  T. P. HALL  1,906,005
AIRPLANE
Filed Aug. 13, 1931   3 Sheets-Sheet 3
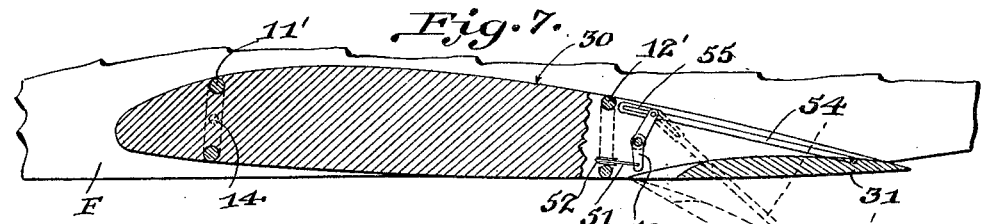
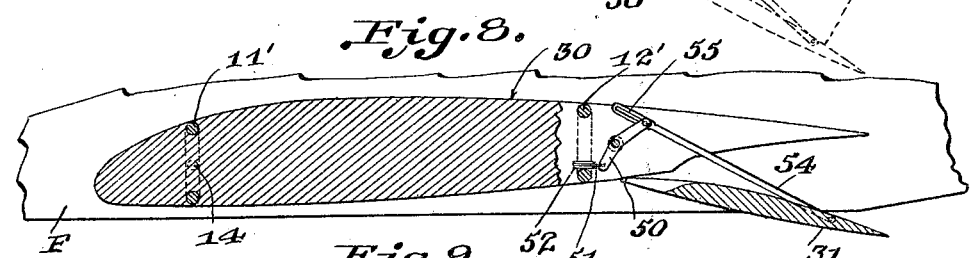
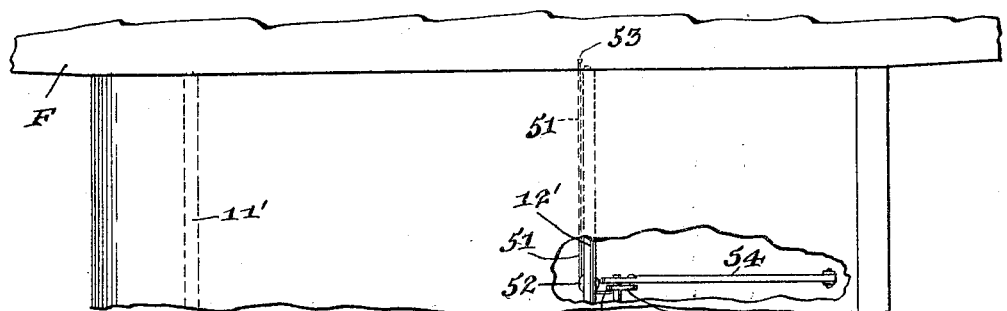
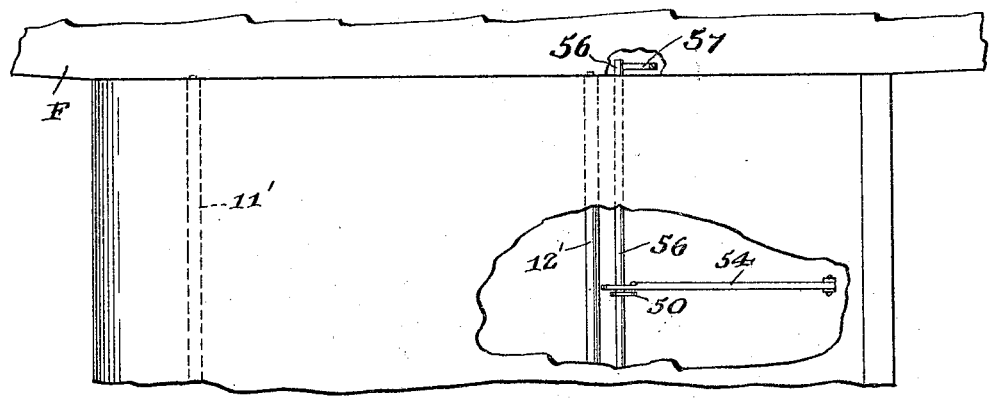
Inventor
Theodore P. Hall
By
Attorney Patented Apr. 25, 1933

1,906,005

UNITED STATES PATENT OFFICE

THEODORE P. HALL, OF ROCHESTER, NEW YORK

AIRPLANE

Application filed August 13, 1931. Serial No. 556,901.

This invention relates to certain improvements in airplanes; and the nature and objects of the invention will be readily recognized and understood by those skilled in the aeronautical art in the light of the following explanation and detailed description of the accompanying drawings illustrating what I for the present believe to be the preferred embodiments or mechanical and aerodynamical expressions of my invention from among various other forms, arrangements, embodiments, combinations and constructions of which the invention is capable within the spirit and the scope thereof.

Primarily, I have by the principles and certain features and characteristics embodied in and forming my present invention, provided for the automatic change or variation of the angle of incidence of the supporting surface or wing of an airplane through bodily shifting or moving of the wing on and with respect to the airplane. Such changes and variations in the wing incidence angle are automatically effected by and in accordance with movements or changes in location of the center of pressure acting on the wing, as such center of pressure movements or changes in location take place with and following changes or variations in flight and airflow conditions to which the airplane and its supporting surface or wing are subjected.

The main purpose, from among certain others, of such automatic changing or variation of the angle of incidence of the wing of an airplane, is to substantially reduce certain difficulties and hazards encountered in landing an airplane, and in eliminating to a material extent the high degree of piloting skill and technique called for in the landing maneuver for an airplane of the conventional types having fixed incidence angle wings. This purpose and the results sought, are attained by the invention through the automatic variation or changing of the incidence angle of the wing, by and when the airplane assumes or is placed in the approximately normal landing attitude (increased or high angle of attack conditions), to such an angle of incidence as will permit the airplane to descend along a steeper path relative to the ground at a reduced rate of descent and with a reduced horizontal or forward component of velocity, while maintaining uniform airflow on the wing.

The reduced rate of descent results in slower landing speeds, and the steeper descent path with decreased forward velocity results in material reduction in the landing run and hence in the size or area of the landing surface required to bring the airplane to a safe landing. The placing of the airplane and its maintenance in, the normal or substantially normal landing attitude during the landing or descending glide, while maintaining sufficient control and without stall, eliminates or substantially reduces the importance of, or necessity for, the conventional "leveling-off" step of the usual landing maneuver, the airplane, in effect, "settling" onto the landing surface in proper landing position. As this "leveling-off" step requires a highly developed depth perception in the pilot and considerable judgment and skill, its elimination removes a major contributing cause of a considerable number of conventional landing accidents.

An embodiment of the invention utilizing a conventional wing, is basically characterized by a mounting of such wing for automatic bodily vertical swinging or movement on and with respect to the airplane so as to automatically change the wing angle of incidence in accordance with flight conditions and the resulting center of pressure movement on the wing, in such a manner as to maintain the normal incidence angle at normal low attack angle conditions, but under high attack angle conditions with rearward center of pressure movement to cause the wing to automatically move to position decreasing the incidence angle; and such embodiment is further characterized by the provision for releasably locking and maintaining the wing in normal incidence position against automatic operation and incidence variation.

The invention includes as a feature, the operative association of the automatically functioning variable incidence wing, with a horizontal or longitudinal control surface of the empennage or tail group of the airplane, so that, such control surface is automatically operated by wing movements to compensate for center of pressure variation and change in the wing incidence angle; and further to provide in such association for independent pilot control of such a longitudinal control surface.

A further basic adaptation of the invention is characterized by the utilization of wings of the variable lift types, such as those having automatically or manually operated wing camber varying flaps, or flaps and air displacement passages, or various other arrangements for increasing wing lift or wing resistance, and for the mounting of such types of wings for automatic wing incidence variation in accordance with center of pressure movements resulting from the functioning of such types of wings; the use of such types of wings enabling an increase in resistance and wing lift and a decrease in speed with the airplane in its steeper path of descent or landing glide.

Another feature in the adaptation of the invention to the variable lift types of wing, is presented by an arrangement operatively associating the variable incidence functioning of the wing with the variable lift operation thereof, so that the lift of the wing can be varied independently of and without causing the wing to function to change its incidence angle, but by which the incidence variation is dependent upon and carried out by and simultaneously with the operation of the wing to vary the wing lift.

With the foregoing general features, characteristics and results in view, as well as certain others which will be readily recognized from the following explanation, the invention consists in certain novel features in design and in combinations and arrangements of parts and elements, all as will be more fully and particularly referred to and specified hereinafter.

Referring to the accompanying drawings, in which similar reference characters refer to corresponding parts throughout the several figures thereof:

Fig. 1 is a view, more or less diagrammatical, in side elevation of an airplane having a wing of the conventional types mounted thereon in accordance with the invention for automatic angle of incidence varying operation, portions of the fuselage being broken away to show an arrangement interconnecting the wing with the elevator of the airplane tail group and with the pilot's control mechanism.

Fig. 2 is a vertical transverse section, more or less diagrammatic, through the wing of Fig. 1 adjacent its inner or root end and showing the mounting arrangement thereof on the airplane, a portion only of the airplane fuselage being shown.

Fig. 3 is a detail view in elevation of the connecting link between the wing of Fig. 1 and the elevator control mechanism of the pilot's control.

Fig. 7 is a more or less diagrammatic vertical transverse section through a wing of the variable lift-flap type mounted for variable incidence operation, and showing an arrangement interconnecting the flap and wing for cooperative functioning, the flap being shown in dotted lines swung independently and without varying the incidence of the wing, to lift increasing position.

Fig. 8 is a view similar to Fig. 7, but showing the wing in incidence decreasing position and the flap in lift increasing position.

Fig. 9 is a fragmentary view in top plan of a portion of the wing of Figs. 7 and 8 and of the fuselage on which mounted, showing the interconnecting arrangement of Figs. 7 and 8.

Fig. 10 is a view similar to Fig. 9, but showing a modified arrangement of the interconnecting mechanism.

Figure 4:
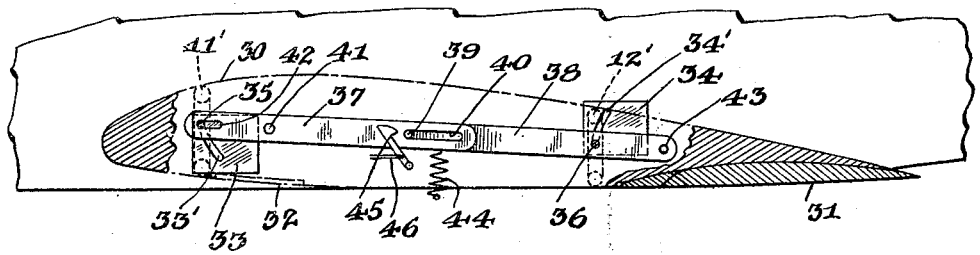
Fig. 4 is a vertical transverse section, more or less diagrammatic, taken through a wing of the variable lift flap type adjacent the root end, and showing an arrangement for mounting the same on an airplane, a portion only of an airplane fuselage being shown, for automatic incidence varying operation.

An embodiment of the invention employing a wing 10 of the more or less conventional type, is disclosed by way of example in Fig. 1 of the drawings, in order to illustrate one manner of carrying out the broad principles and several features of the invention. In such embodiment the wing 10 happens to be of the low, monoplane type incorporated in and forming the supporting surface for the airplane which includes the usual fuselage or body F, landing gear G, motor driven propeller P, and the empennage or tail group E, including the usual horizontal stabilizer S and the vertically swingable longitudinal control surface or elevator T.

Within fuselage F is the usual or any desired or suitable pilot's control mechanism, which includes in this instance, a control stick C, operatively coupled by link 1, with the crank 2, the opposite ends of the vertical arm of which are connected with the ends of crank 3 adjacent the tail of fuselage F, by cables 4. The upper end of crank 3 is connected by link 5 with the depending elevator crank or horn 6. The foregoing arrangement is more or less conventional and will be readily understood by reference to Fig. 1. Forward and rearward movements of control stick C, through the above described mechanism, cause vertical swinging, downwardly and upwardly, respectively, of the elevator T for longitudinal control of the airplane.

The wing 10, referring particularly to Fig. 2 of the drawings, is of conventional or any suitable construction, and includes the forward wing spar 11 and the rear wing spar 12. Wing 10 is preferably of a contour or airfoil section such as to have as a characteristic, a substantially stable center of pressure movement, that is, a center of pressure movement rearward as the angle of attack of the wing increases. While a wing with two spars is shown in the example, single spar or multispar wing construction, or other wing arrangements obviously can be employed.

The wing 10, following the basic principle of my invention, is mounted on fuselage F for vertical swinging bodily around a horizontal axis longitudinally of the wing, in order to change the angle of incidence of the wing on and with respect to the fuselage F and the airplane of which it forms an element. For instance, referring to Fig. 2 in connection with Fig. 1 of the drawings, the wing 10 is mounted for vertical swinging on and around the forward spar 11 thereof as an axis, the inner or root end of spar 11 being provided with a pin, shaft, or other suitable pivotal mounting member 14, rotatably journaled in any suitable manner on and in fuselage F. The rear spar 12 is provided with any suitable pin, shaft or other inwardly projecting member 15 at its inner or root end which is vertically movably engaged with the fuselage F to permit vertical movements of the after or trailing portion of wing 10, as the latter pivots or rotates on and around the forward axis provided by member 14. Mounting pins or members 14 and 15 form the ties on and by which wing 10 is mounted on and coupled to fuselage structure F.

The fuselage structure F may carry and incorporate therein a plate member 16 vertically disposed thereon adjacent rear wing spar 12 and formed with the vertical arcuate slot 17 therein, into which the member 15 is vertically slidably received and confined. A compression spring 18, or other suitable force exerting member, is mounted in slot 17 interposed between spar carried pin member 15 and the upper end of slot 17, in position continuously exerting a force downwardly on member 15 tending to maintain such member with wing 10 in downwardly swung, normal angle of incidence position. Attention is here directed to the fact that the invention includes the application of such a force through various other means than the specific arrangement of spring shown.

The relative arrangement and mounting of wing 10 and location of the wing mounting points 14 and 15, is such that, at normal or low attack angle of flight conditions of the airplane, the normal center of pressure acting on the wing is so located as to permit and cause the wing, aided by the force exerted by spring 18, to maintain its lowered position at the desired normal angle of incidence, as shown by Fig. 1 of the drawings. However, under flight conditions of the airplane increasing the angle of attack, the center of pressure acting on wing 10 moves rearwardly with the development of forces and pressures sufficient to overcome the force of spring 18 and swing the wing upwardly around axis 14 to raise the trailing portion of the wing to decrease or change the angle of incidence in a negative direction. Thus, the airplane including fuselage F, can be placed in a normal landing attitude (increased angle of attack conditions) with the tail down and nose raised, and due to the automatic change in the angle of incidence of wing 10 resulting from such change in flight conditions, a uniform airflow on the wing is maintained, and the airplane can descend in such landing attitude along a steeper path relative to the ground with reduced forward movement.

In order to compensate for the changes of location of the wing center of pressure and resulting automatic actuation of wing 10 to vary its angle of incidence, I have provided for operatively associating the wing 10 with horizontal or longitudinal control surface of the airplane tail group or empennage E. For example, referring now to Fig. 1 of the drawings, the wing 10 adjacent rear spar 12 and the wing mounting member or tie 15, is coupled into and with the crank 2 of the pilot's control mechanism for elevator T, by the link member 20. This link member 20 is pivotally connected at its lever end to wing 10, and extends upwardly and is pivotally connected at its upper end to the end of the forwardly extending horizontal arm of crank 2 (see Fig. 1).

As the trailing portion of wing 10 moves upwardly in the automatic incidence angle varying actuation of the wing, link member 20 pivots crank 2, and through cables 4 and crank 3, swings the elevator T upwardly the required degree to compensate in the longitudinal control for the shift in center of pressure location. On downward swinging of wing 10 to normal angle of incidence position, elevator T is swung downwardly to resume normal longitudinal control position. The elevator T is thus automatically swung by and with the wing 10 in accordance with center of pressure movements and incidence angle changes, to positions compensating in the longitudinal control of the airplane for such changes.

Where, as in the specific arrangement of the example hereof, the wing 10 is operatively coupled with the elevator T, I have provided for the automatic wing actuation of the elevator independently of and while permitting normal elevator operation by the pilot's control mechanism. The link member 20, referring here to Fig. 3 of the drawings, is formed with a longitudinal slot 21 in the upper end thereof which receives slidably a pivot pin 2a carried by and pivotally connecting the end of the horizontal arm of crank 2, to the link member 20, and springs 22 are mounted and confined in the slot at opposite sides of and bearing at their inner ends on the pin 2a.

With this arrangement, providing in effect a floating connection between link 20 and crank 2, the magnitude of the forces of the springs 22 is sufficient to transmit without substantial yield, movements of the wing 10 and link 20, to pin 2a for pivoting of crank 2 and automatic actuation of the elevator T. Manual pilot actuation of the elevator T is made in the usual manner by direct control stick actuation of crank 2 through link 1, springs 22 yielding to permit such actuation relatively and to a certain degree independently of the position of the crank automatically given by the position of wing 10. Attention is directed to the fact that while pilot actuation of elevator T will tend to cause simultaneous movements of wing 10, such tendency is a desirable one, because if the control stick movement is forward to lower elevator T to come out of the high angle of attack condition to the low attack angle condition, it is desirable to have wing 10 in the normal condition and the forces will be such as tend to cause this result. Similarly, the tendency on passing from low angle of attack to high angle of attack conditions by pilot actuation to raise elevator T will tend to raise wing 10, which also is a desirable condition.

As equivalent to the disclosed wing automatic actuation of elevator T, the invention includes the connection of wing 10 with the stabilizer S of the adjustable type for actuation of said stabilizer automatically by and with wing angle of incidence actuation. It is not considered necessary to show such connection here, as a mechanism similar to that disclosed for connecting elevator T may be employed, such mechanism if desired being independent of the pilot control mechanism for the elevator T.

Under certain flight conditions, it may be desired to eliminate wing angle of incidence variation, as for example in the high angle of attack, power-on, climbing condition, and hence as a further feature of my invention I have provided for releasably locking wing 10 in normal position against incidence angle varying movements. As a possible locking mechanism, I have shown in Fig. 2, of the drawings, a stop or locking lever 23 pivotally mounted, say to plate 16, at its upper end above the lower end of slot 17 and depending downwardly to a position for engaging over the pin member 15 carried by rear wing spar 12, to hold and maintain wing 10 in normal position against upward swinging. Any suitable or desired arrangement is provided under the control of the pilot for swinging lever or stop 23 to and from locking position. Such an arrangement may include and is typified by a rod, link, or the equivalent 24 pivotally connected to locking lever or stop 23, for swinging the lever to position locking and holding wing 10 against movement, and for swinging the lever to position removed from pin 15 and releasing the wing for automatic angle of incidence varying operation.

In the embodiment of wing 10, it is within the contemplation of the invention to include a manual actuation of the wing to vary the angle of incidence thereof, instead of automatic actuation, particularly in the combination with the operative association of a variable incidence wing with a horizontal or longitudinal control surface of the airplane. In such an arrangement, any suitable mechanism, such as that typified by a manual control to be described in connection with Fig. 6 of the drawings, may be utilized.

Figure 5:
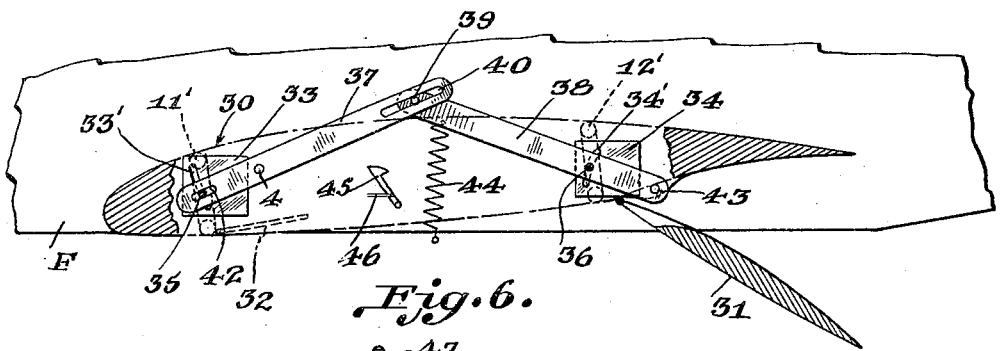
Fig. 5 is a view similar to Fig. 4, but showing the wing in automatically actuated incidence angle decreasing position.

The invention is of particular utility and efficiency when embodied in a wing of the so-called high or variable lift types, and in Figs. 4 and 5 of the drawings I have disclosed such type of wing and a modified form of wing mounting, for automatic incidence angle variation. The wing 30 of Figs. 4 and 5 is of the automatically operated variable lift type having an air displacement passage therethrough controlled at its rear or discharge end by the vertically swingable, wing camber varying flap 31, and at its forward or inlet end by the vane 32. With such a wing, under high angle of attack conditions the vane 32 opens and wing flap 31 lowers to camber increasing position opening the discharge of the wing passage for displacement of air therethrough, with resulting increase in wing lift. On return to low attack angle conditions, vane 32 closes, and wing flap 31 raises, to restore the normal or high speed contour and airfoil section to wing 30.

A modified mounting arrangement for wing 30, from that of wing 10, is shown as including the spaced forward and rear plates 33 and 34, fixed in vertically disposed position on fuselage F adjacent the inner or root ends of the forward and rear spars 11' and 12', respectively, of wing 30. Forward spar 11' carries at its root end a pin or tie member 35 slidably received and confined in a downwardly and rearwardly curved slot 33' in forward plate 33, and rear wing spar 12' carries at its root end a pin or tie member 36 slidably received in an upwardly and rearwardly curved slot 34' in rear plate 34.

Forward and rear, normally longitudinally alined and substantially horizontally disposed link members 37 and 38 extend chordwise of wing 30 between the root end thereof and fuselage F, with the inner ends of the links overlapping and slidably and pivotally connected by the pin 39 on link 38 engaged in slot 40 of link 37. The link 37 is pivoted for vertical swinging on a pin or tie member 41 fixed to fuselage F intermediate the link ends, and is pivotally coupled at its forward end to the pin or wing tie member 35, which slidably engage in a slot 42 in the link end. The rear end of rear link 38, is pivotally mounted for vertically swinging of the link on a pin or tie member 43, fixed to fuselage F, and at an intermediate point link 38 is pivotally connected to rear wing tie member 36, which extends therethrough into slot 34' of plate 34. A tension spring 44 is connected between the inner end of one of the links, in this instance link 37, and the fuselage structure therebelow, to normally maintain the links in their downwardly swung, alined positions of Fig. 4.

The foregoing mounting arrangement provides for the vertical bodily movement of wing 30 on fuselage F to vary the angle of incidence of the wing. The normal angle of incidence position of wing 30 is shown in Fig. 4, with the leading edge of the wing raised and pin or wing tie member 35 at the upper end of slot 33', and the trailing edge portion of the wing lowered with pin or wing tie member 36 at the lower end of slot 34' of plate 34. In this normal wing position, the links 37 and 38, are in longitudinally alined position extending on their pivots 41 and 43 across and between wing tie members 35 and 36.

If the inner ends of links 37 and 38 are raised or forced upwardly against the tension of spring 44, forward link 37 pivots on pin or fuselage tie member 42 to swing its forward end downwardly and lower the leading edge of wing 30 to which it is connected by wing tie member 35 in link slot 42. Upward swinging of the inner end of link 38, pivots the link on pin or fuselage tie member 43, and raises or swings the trailing edge portion of wing 30 upwardly, through the pivotal connection of the link 38 with the wing by the wing tie member 36. Thus, the wing 30 is moved bodily rearwardly a distance while simultaneously swinging or rotating vertically around a horizontal axis, to lower the leading edge portion and elevate the trailing edge portion thereof, into the position of Fig. 5, with the angle of incidence of the wind decreased. Upon release of the force raising or swinging the connected inner ends of the links upwardly, the wing 30 swings and moves bodily, assisted by the force of spring 44, to normal angle of incidence position of Fig. 4.

The relation and spacing between the wing tie members 35 and 36, and the fuselage tie members 41 and 43, is such that with the airplane at a certain attitude and a certain center of pressure location existing, say under normal low attack angle or high speed flight conditions, the resultant force at the pivotally connected inner ends of links 37 and 38, is not of sufficient magnitude to cause upper swinging of the links, and wing 30 remains in the normal angle of incidence position of Fig. 4.

Upon the establishment of flight conditions, for example high angle of attack or low speed conditions, the center of pressure moves rearwardly of wing 30, and an upward force is developed acting on the inner ends of links 37 and 38 at the slot 40, of sufficient magnitude to move the links upwardly against the tension of spring 44, and result in the bodily movement of the wing to the reduced angle of incidence position of Fig. 5. Return to normal or say low attack angle flight conditions, with forward center of pressure movement, destroys the force maintaining the links in upwardly swung position, and causes the wing, aided by spring 44 in this example, to return to and assume normal position of Fig. 4.

With the variable lift-flap and passage type of wing 30, operation of the flap 31 and displacement passage in the wing to increase wing lift, results in a rearward center of pressure movement, with the subsequent and following bodily movement of the wing by the forces established on the above described mounting, to the decreased or negative incidence angle position of Fig. 5. In the illustrated example of wing 30, the flap and displacement passage operation is automatic and in accordance with flight conditions, that is, under high attack angle conditions, the flap 31 operates to open the displacement passage and increase wing lift, with subsequent automatic movement of the wing bodily to change the angle of incidence. However, the invention includes a manual operation of the flap 31 to increase the lift with the initiation and following automatic incidence varying operation of the wing. The incorporation and embodiment of the invention with a variable lift type of wing is of particular advantage and increased efficiency, because with the change in wing incidence permitting the airplane to descend the steeper path at reduced forward velocity, the operation of the variable lift wing to increase the wing lift and resistance, further reduces the speed along the path of descent.

As in the form of wing and mounting of the invention of Fig. 1, the arrangement of Figs. 4 and 5 also includes means for releasably locking the wing 30 against incidence varying movement and in normal incidence position. For instance, in Fig. 4, I have shown a hook member or catch 45 pivotally mounted on the fuselage structure F, for engaging over pin 39 which slidably connects the inner ends of links 37 and 38, with such links and the wing in normal incidence angle position. Any suitable pilot controlled mechanism including an operating rod or lever 46 pivotally connected to catch 45 is provided for swinging catch member 45 to and from wing locking position. It will be understood of course, that with a wing of the type of wing 30, when the wing is locked against automatic incidence varying operation, the variable lift operation of flap 31 may still be carried out, either automatically or manually as the case may be.

Figure 6:
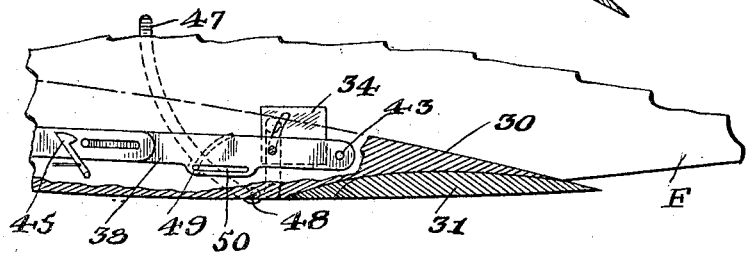
Fig. 6 is a fragmentary view of a portion of the wing and its mounting of Figs. 5 and 6, but with manual operating mechanism for actuating the wing to vary the angle of incidence thereof.

Manual operation of the wing 30 for incidence varying movement thereof, can be carried out in cooperation with functioning of the variable lift of the wing. In Fig. 6 of the drawings, I have shown as an example, a form of manual operating mechanism operatively associated with the variable incidence mounting of the form of Figs. 4 and 5, which comprises a lever 47 pivotally mounted at its lower end at 48 to the fuselage structure below the link 38 and operatively engaged with such link by a pin 49 slidably engaged in the slot 50 disposed longitudinally in link 38. With the wing 30 in normal position, lever 47 is forwardly disposed, and to move wing 30 to incidence decreased position, the lever 47 is swung rearwardly on pivot 48. Rearward swinging of lever 47, causes pin 49 to swing upwardly to raise link 38, pin 49 sliding rearwardly in link slot 50, and thus bodily move wing 30 in a manner hereinbefore described, to incidence changed position.

A further arrangement of variable lift-flap type of wing similar towing 30, mounted for incidence angle varying movements in accordance with the form of wing mounting of Fig. 1, is shown in Figs. 7 to 9 of the drawings, with a modified form of such arrangement shown in Fig. 10. The feature of such arrangements resides in the association between the incidence varying movement of the wing and the wing flap, by which incidence varying movement of the wing cannot be carried out without simultaneous flap operation, but with which flap operation is possible independently of and without accompanying wing movement.

Referring to Figs. 7, 8 and 9, wing 30 is provided with a crank 50, or a plurality thereof spaced along the span of the wing, pivotally mounted in vertically disposed position therewithin adjacent but above the pivotal mounting of wing flap 31 on the wing. A cable 51 is connected to the lower end of crank 50 and is extended forwardly to a horizontally disposed pulley 52, then inwardly over such pulley, through the wing to the fuselage structure F to which it is fixed at its inner end at 53. (See Fig. 9.) A link 54 is pivotally and slidably connected by the slot 55 to the upper end of crank 50, and extends rearwardly and downwardly from the crank to a point adjacent the trailing edge of flap 31 at which it is pivotally connected with the flap.

With the foregoing arrangement, upward movement of the trailing portion of wing 30 swinging from the forward pivot pin or tie member 14 to change the angle of incidence from the normal angle shown in Fig. 7, places the cable 51 under tension and rocks crank 50 to force link 54 rearwardly and lower flap 31 to wing lift increasing position, as shown by Fig. 8 of the drawings. Thus, with the decreased incidence angle caused by the changed position of wing 30 (see Fig. 8), the flap 31 is simultaneously lowered thereby to operative wing lift increasing position. It is noted that in the normal position of wing 30 and flap 31 of Fig. 7, the link 54 is positioned with crank 50 at and engaging the rear end of link slot 55, so that rearward movement of the upper end of the crank causes simultaneous rearward movement of link 54.

With wing 30 in normal angle of incidence position and flap 31 in normal raised position (Fig. 7), the flap can be operated independently and without causing accompanying movement or incidence angle change of wing 30, due to the slot 55 in link 54. Such independent operation of flap 31 to lowered position with the wing 30 remaining in normal position, is shown by dotted lines in Fig. 7.

A modified arrangement for connecting crank 50 with fuselage structure F is shown in Fig. 10, in which the cable 51 is eliminated, and a torque tube 56 is substituted. This torque tube 56 is rigidly connected, to crank 50 at its axis for rotation with the crank, and extends inwardly through the wing to fuselage structure F where it is connected to a crank 57 rigidly fixed to the fuselage structure. Upward movement of wing 30 results in rocking crank 50 and operation of flap 30, all as explained above in connection with Figs. 7, 8 and 9.

Any usual or desired mechanism for flap control of the wing 30, as well as mechanism for manual control of the wing, can be incorporated in and interconnected with the arrangements above described as operatively associating the wing flaps with the incidence varying movements of the wing. A stop mechanism such as that shown and described in connection with Figs. 1 and 2, including lever member 23 and operating rod 24, is to be operatively coupled with the flap 31 in the forms of Figs. 7 to 10, for operation by the flap through rod 24 to swing lever 23 to unlocked position releasing wing 31 for incidence variation when the flap is lowered, and to position locking the wing when the flap is raised.

In the forms of the invention utilizing a variable lift type of wing, such as the wing 30, the wing can be operatively associated with a horizontal or longitudinal control surface of the airplane, in the manner shown in Fig. 1, and for the purpose described in connection therewith.

While wings of the monoplane type happen to be disclosed in the several examples of the invention herein, obviously the invention is in no sense so restricted, as wings and cellules thereof of the multiplane types are fully adapted for mounting and operation in accordance with the invention. It so happens further, that only the wings at one side of the airplane fuselage F are disclosed in the drawings, but the opposite wings can be of the continuous type or formed of opposite panels, and in either event it is preferable to duplicate the mounting arrangements of the invention at opposite sides of the fuselage, or at each panel root, the wing ties if desired being continuous and extending across the fuselage from wing root to wing root, although the invention is not essentially so limited. Also, in the case of wings of the cantilever types with through beams, connecting to the fuselage can be had at a point other than center line of the beam as shown in the example hereof, that is, on any side of the beam.

It is also evident that various modifications, changes, variations, substitutions, eliminations and additions might be resorted to without departing from the spirit and scope of my invention, and hence I do not desire to limit myself in all respects to the exact and specific disclosures hereof.

What I claim, is:

1. In an airplane, a wing of the variable lift type including means for increasing lift capacity of the wing, said wing movably mounted for changing the angle of incidence thereof and automatically caused to move to change its angle of incidence by air pressure conditions established by operation of the variable lift means to increase the wing lift.

2. In an airplane, a wing of the variable lift type including a lift capacity increasing wing flap, said wing mounted for bodily movement to change its angle of incidence and automatically actuated for incidence angle change by air pressures acting thereon established by operation of the wing flap to increase wing lift.

3. In an airplane, a wing of the automatic variable lift capacity type functioning to increase lift under high angle of attack flight conditions, and said wing mounted for bodily movement by the action of air pressures thereon established by lift increasing functioning of the wing, to change the wing angle of incidence.

4. In an airplane, a wing of the variable lift type including a camber and lift increasing flap member, operation of said flap member to increase wing lift causing rearward movement of the center of pressure acting on the wing, and said wing mounted for bodily movement to change its angle of incidence, said wing automatically moved to change its angle of incidence by rearward movement of the center of pressure resulting from lift increasing operation of said flap member.

5. In an airplane, a wing of the variable lift type including a lift increasing flap member, said wing mounted for bodily movement to change its angle of incidence, means operatively associating said wing and the flap to cause lift varying operation of the flap by and simultaneously with incidence changing movement of the wing, and said flap operable independently and without accompanying incidence changing movement of said wing.

6. In an airplane including a fuselage, a wing of the variable lift type including a lift increasing wing flap member, said wing mounted for bodily movement with respect to the fuselage to change its angle of incidence, mechanism for operating said flap, a connection from said mechanism fixed to the fuselage and operatively associated with the wing whereby incidence varying movement of the wing causes actuation of said mechanism and simultaneous lift varying operation of said flap member.

7. In an airplane, a fuselage, a wing mounted on the fuselage for bodily swinging vertically to change the angle of incidence of said wing, the mounting for said wing including forward and rear members fixed on the fuselage with the forward member having a downwardly and rearwardly curved vertical slot therein and the rear member having an upwardly and rearwardly curved vertical slot therein, forward and rear wing tie members fixed to the wing and slidably engaged and confined in the slots, respectively, of said forward and rear fuselage members, forward and rear normally horizontally disposed link members having their inner ends slidably and pivotally connected, the forward link member pivoted for vertical swinging intermediate its ends to the fuselage and having its forward end pivotally and slidably connected to the forward wing tie member, the rear link member pivotally mounted at its rear end to the fuselage for vertical swinging at a point spaced rearwardly from the rear wing tie member and pivotally connected intermediate its ends to the rear wing tie member, upward swinging of the connected inner ends of said link members causing downward swinging of the leading edge and upward swinging of the trailing edge of the wing to bodily move the wing to decreased angle of incidence position on the fuselage.

8. In an airplane including a fuselage, a wing of the variable life type including a lift increasing vertically swingable flap member, said wing mounted on the fuselage for bodily vertical swinging thereon to change its angle of incidence, mechanism for vertically swinging said flap, including a crank pivotally mounted on the wing, and a link pivotally connecting said flap with the crank, a connection fixed at one end to the fuselage and extending to a fixed point on the wing, and said connection coupled to said crank whereby bodily movement of the wing on the fuselage causes said connection to operate the crank and simultaneously swing said flap.

9. In an airplane, a wing therefor characterized by a center of pressure movement rearwardly as the angle of attack of the wing increases, said wing mounted for vertical bodily swinging to vary its angle of incidence on and with respect to the airplane, and said wing automatically swung upwardly to decrease the angle of incidence thereof by the action of the rearwardly moving center of pressure upon increase in the wing angle of attack.

10. In an airplane, a wing therefor characterized by a center of pressure movement rearwardly as the angle of attack of the wing is increased, said wing mounted for automatic vertical bodily movement to and from a substantially normal angle of incidence to vary its angle of incidence on and with respect to the airplane in accordance with movement of the center of pressure, and the mounting of said wing with respect to the airplane such that upon wing angle of attack increasing conditions the wing is moved by the action of rearward center of pressure movement to decrease its angle of incidence and upon attack angle decreasing conditions and forward center of pressure movement the wing is moved to increase its angle of incidence.

11. In an airplane, including a vertically swingable longitudinal control surface therefor, a wing characterized by a center of pressure movement rearwardly as the angle of attack of the wing increases, said wing mounted for automatic movement bodily on and to vary its angle of incidence with respect to the airplane, the mounting of said wing such that upon angle of attack increasing conditions the rearward center of pressure movement causes the wing to move bodily to decrease its angle of incidence, and means operatively associating said longitudinal control surface with the wing for upward swinging of the control surface by angle of incidence decreasing movement of said wing.

12. In an airplane including a vertically swingable longitudinal control surface therefor, a wing characterized by a center of pressure movement rearwardly as the angle of attack of the wing increases, said wing mounted for automatic movement bodily on and to vary its angle of incidence with respect to the airplane, the mounting of the wing such that upon angle of attack increasing conditions the rearward center of pressure movement causes the wing to move to angle of incidence decreasing position, means operatively associating said longitudinal control surface with the wing for upward swinging of the control surface by angle of incidence decreasing movement of said wing, and pilot control mechanism coupled with said control surface, said control mechanism operable to swing said control surface independently of the wing actuation thereof and in any position to which the surface is swung by the wing.

13. In an airplane, in combination, a variable angle of incidence wing on the airplane, a vertically swingable longitudinal control surface for the airplane, means operatively connecting said control surface with the wing to swing the control surface upwardly upon decrease in the wing angle of incidence and to swing said control surface downwardly upon increase in the wing angle of incidence, and pilot control mechanism operatively coupled with said control surface, said mechanism operable to swing the control surface independently of the wing operation thereof and in any position to which the surface is swung by the wing.

14. In an airplane, a wing of the variable lift type including means for increasing the lift capacity of the wing, operation of said means causing rearward movement of the center of pressure on the wing, and said wing mounted for movement to change its angle of incidence, said wing automatically moved to decrease its angle of incidence by rearward movement of the center of pressure on the wing resulting from lift increasing operation of said means.

15. In an airplane, a wing of the variable lift type automatically operated under high angle of attack conditions to increase lift capacity of the wing, lift increasing operation of the wing causing rearward movement of the center of pressure on the wing, and said wing mounted for bodily movement to vary the angle of incidence of the wing, lift increasing operation of the wing automatically causing angle of incidence decreasing movement of the wing under the action of the rearward center of pressure movement.

16. In an airplane, a wing therefor characterized by a rearward center of pressure movement with increase in the wing angle of attack, said wing mounted on the airplane for bodily movement thereof rearwardly while simultaneously swinging vertically to decrease the angle of incidence of the wing on and with respect to the airplane, and the said wing automatically moved rearwardly and swung upwardly to decrease its angle of incidence by the action of the rearwardly moving center of pressure resulting from increasing in wing angle of attack.

17. In an airplane, a body, a wing mounted on the body for bodily swinging vertically to change the angle of incidence of the wing on the body with respect to the airplane, and the mounting for said wing including on the body, a forward downwardly and rearwardly curved vertically disposed slot and a rear upwardly and rearwardly curved vertically disposed slot, and forward and rear wing tie members fixed on the wing and slidably received in said forward and rear slots, respectively, said slots on vertical swinging of the wing to decrease the angle of incidence causing simultaneous rearward bodily movement of the wing, and on swinging to increase the angle of incidence causing forward movement of the wing on the body.

18. In an airplane, a wing of the variable lift type including a wing lift increasing flap member, said wing mounted on the airplane for bodily movement to change the wing angle of incidence, and means operatively associating the wing and flap to cause lift varying operation of the flap by and simultaneously with incidence changing movement of the wing.

19. In an airplane including a longitudinal control surface and pilot control mechanism therefor, a wing mounted on the airplane for movement to change its angle of incidence, means operatively connecting the wing with the pilot control mechanism for actuating the longitudinal control surface by incidence changing movement of the wing, and a floating coupling operatively interposed in said means between the wing and the pilot control mechanism, said floating coupling including operatively associated elements relatively movable with respect to each other whereby the pilot control mechanism is operable independently of the wing operation thereof.

Signed at Rochester, Monroe County, New York, this 24th day of June, 1931.

THEODORE P. HALL.